United States Patent [19]

Daifuku et al.

[11] Patent Number: 5,108,855
[45] Date of Patent: Apr. 28, 1992

[54] SECONDARY BATTERY

[75] Inventors: Hideharu Daifuku, Akishima; Takao Ogino, Tokorozawa; Masao Ogawa, Kawagoe; Takahiro Kawagoe, Tokorozawa; Toyoo Harada; Isamu Shinoda, both of Sendai, all of Japan

[73] Assignees: Bridgestone Corporation, Tokyo; Seiko Electric Components Ltd., Sendai, both of Japan

[21] Appl. No.: 669,940

[22] Filed: Mar. 15, 1991

[30] Foreign Application Priority Data

Mar. 19, 1990 [JP] Japan .................................. 2-70648
Mar. 19, 1990 [JP] Japan .................................. 2-70649
Mar. 19, 1990 [JP] Japan .................................. 2-70650

[51] Int. Cl.$^5$ .............................................. H01M 4/60
[52] U.S. Cl. ...................................... 429/191; 429/213
[58] Field of Search ........ 429/212, 213, 209, 191–193, 429/218, 152; 252/182.1

[56] References Cited

U.S. PATENT DOCUMENTS

| 4,504,557 | 3/1985 | Filatovs .......................... 429/213 X |
| 4,518,665 | 5/1985 | Fujita et al. ..................... 429/213 X |
| 4,816,359 | 3/1989 | Nagele et al. ..................... 429/213 |
| 4,865,932 | 9/1989 | Masuda et al. ................. 429/213 X |

Primary Examiner—Anthony Skapars
Attorney, Agent, or Firm—Oblon, Spivak, McClelland, Maier & Neustadt

[57] ABSTRACT

A secondary battery comprising a positive electrode, a negative electrode, and an electrolyte is improved in discharge performance by forming the positive electrode from a composite electrode material including a conductive organic polymer and a dischargeable metal oxide and/or metal chalcogenide.

12 Claims, 3 Drawing Sheets

SECONDARY BATTERY

This invention relates to secondary batteries using conductive organic polymers and/or dischargeable metal oxides or metal chalcogenides as their positive electrode active material.

BACKGROUND OF THE INVENTION

Heretofore, conductive organic polymers such as polyaniline, polypyrrole, polyacetylene, and polythiophene have been used as battery electrode materials since they are light weight and flexible and have an oxidation-reduction function. Secondary batteries having such polymers incorporated as their electrode active material are known to provide improved charge/discharge efficiency and high energy density. Especially, the polyaniline is improved in cycle life and self discharge property over the other conductive organic polymers. There have been commercially available some batteries using polyaniline as positive electrode active material.

However, the batteries using polyaniline as positive electrode active material still have some problems to be cleared off for practical application.

In accordance with the recent trend for electric equipment to be of the cordless and digital types, an increasing number of equipment are required to generate and transmit digital signals. Small size batteries which are often used as a power supply for generating and transmitting digital signals have to perform well in a pulse discharge mode. However, the batteries using polyaniline or conductive organic polymers as their positive electrode active material cannot always provide satisfactory pulse discharge property for the reason that the conductive organic polymers are not so high in electric conductivity and for some reasons associated with the battery arrangement.

Further, these batteries can maintain sufficient discharge capacity during normal operation of the electric equipment which are loaded with the batteries. Often, such equipment are kept in stock for a long term before delivery to the consumer. Then the battery will spontaneously discharge during the warehouse storage. This leads to a possibility that after delivery to the consumer, the battery fail to discharge sufficient electricity upon actual use of the equipment.

SUMMARY OF THE INVENTION

Therefore, an object of the present invention is to provide a novel and improved secondary battery having a positive electrode active material in the form of a conductive organic polymer which has satisfactory initial discharge capacity and pulse discharge properties and is thus advantageously applicable to a variety of types of electric equipment.

Another object of the present invention is to provide a secondary battery which after a long term shelf storage, can provide effective discharging on subsequent use.

A further object of the present invention is to provide a secondary battery having an improved cycle life.

The inventors have discovered that a secondary battery having satisfactory initial discharge capacity and pulse discharge properties can be obtained by using a positive electrode comprising a first electrode material of a conductive organic polymer, typically polyaniline and a second electrode material containing a dischargeable metal oxide and/or metal chalcogenide stacked and bonded one on another.

Also, a secondary battery using a positive electrode in the form of a sheet conductive organic polymer which is partially or entirely impregnated with an adhesive composition comprising an adhesive base and a dischargeable metal oxide and/or metal chalcogenide blended therein is substantially increased in initial discharge capacity due to the synergistic effect between the conductive organic polymer and dischargeable metal oxide and/or metal chalcogenide in the positive electrode. Then even after the battery is shelf stored as loaded in electric equipment for an extended period of time, the battery can provide sufficient discharging upon subsequent or first use. For the second and subsequent charge/discharge operations, the conductive organic polymer can exert its function as the positive electrode active material, ensuring that the battery continue stable charge/discharge operation for an extended period of service time.

Known in the art are batteries using composite materials comprised of a conductive organic polymer and an inorganic oxide or inorganic chalcogenide as the positive electrode (see Japanese Patent Application Kokai Nos. 102162/1988 and 202858/1988). These batteries are designed to improve battery performances such as cycle life, discharge voltage flatness, and recovery after overdischarge. They use positive electrodes which are manufactured by mixing the conductive organic polymer and metal oxide or metal chalcogenide in powder form, adding a fluoro-resin binder and conductive aids thereto, and molding the composition. Undesirably, these positive electrodes are insufficient in initial discharge capacity since the conductive organic polymer and metal oxide or chalcogenide are less efficient in current collection, and the addition of the binder and conductive aids leads to a loss of discharge capacity.

In contrast, the positive electrode contemplated in the present invention is manufactured by partially or entirely impregnating a sheet conductive organic polymer with an adhesive composition comprising a dischargeable metal oxide and/or metal chalcogenide to form a composite material of the conductive organic polymer and the metal oxide and/or chalcogenide. Since the conductive organic polymer has a fibril structure, this composite material or electrode is of the structure wherein the metal oxide and/or chalcogenide fills in voids in the conductive organic polymer. The composite material as a whole is effective not only for collecting current flow, but also for increasing the initial discharge capacity without spoiling the discharge capacity of the conductive organic polymer.

Further, the inventors have discovered in conjunction with a battery having polyaniline or conductive organic polymer incorporated as the positive electrode active material that a conductive adhesive containing a metal oxide and/or metal chalcogenide which is dischargeable in itself is an effective means for securing the positive electrode to a positive electrode casing or current collector, which can improve the pulse discharge properties of the battery.

Moreover, the inventors have discovered that cycle life is considerably increased by impregnating an electrode material layer of a dischargeable metal oxide and/or metal chalcogenide partially or entirely with an adhesive comprising a conductive organic polymer, and that cycle life is similarly increased by securing an electrode material layer of a dischargeable metal oxide and- /or metal chalcogenide to a positive material casing or current collector with an adhesive comprising a conductive organic polymer.

Briefly stated, the present invention is directed to a chargeable/dischargeable secondary cell or battery comprising a positive electrode, a positive current collector, a negative electrode, and an electrolyte, which are typically enclosed in a pair of mated positive and negative casings. According to a first aspect, the positive electrode is comprised of a composite electrode material of laminate structure including a first electrode material layer of an electroconductive organic polymer and a second electrode material layer containing a dischargeable metal oxide and/or metal chalcogenide stacked one on another.

In one preferred embodiment, the first and second electrode material layers are bonded with a conductive adhesive containing carbon. The first electrode material layer is disposed on the side of a positive casing or a positive current collector. The positive electrode is secured to a positive casing or a positive current collector with a conductive adhesive containing carbon.

The secondary battery according to the first aspect is substantially improved in initial discharge capacity and pulse discharge property. Even after it is stored for a long time as loaded in an electric equipment, it can afford satisfactory electricity upon use and thereafter, continue stable charge/discharge operations. Due to its improved pulse discharge property, the battery is also advantageous as a power supply to electric equipment or appliances requiring to generate and transmit digital signals.

According to a second aspect, the positive electrode is comprised of an electrode material layer of a conductive organic polymer which is partially or entirely impregnated with an adhesive containing a dischargeable metal oxide and/or metal chalcogenide. In one preferred embodiment, the positive electrode is secured to a positive casing or a positive current collector with a conductive adhesive containing carbon.

The secondary battery according to the second aspect has so high initial discharge capacity that even after it is stored for a long time as loaded in an electric equipment, it can afford satisfactory electricity upon use and thereafter, continue stable charge/discharge operations.

According to a third aspect, the positive electrode is comprised of an electrode material layer of a conductive organic polymer which is secured to a positive casing or positive current collector with an adhesive containing a dischargeable metal oxide and/or metal chalcogenide.

The secondary battery according to the third aspect has high energy density, excellent charge/discharge properties and pulse discharge property and is substantially improved in initial discharge capacity by virtue of the metal oxide and/or metal chalcogenide in the conductive adhesive. These improved properties allow the battery to be used as a power supply to electric equipment or appliances requiring to generate and transmit digital signals.

According to a fourth aspect, the positive electrode is comprised of an electrode material layer based on a dischargeable metal oxide and/or metal chalcogenide which is partially or entirely impregnated with an adhesive containing a conductive organic polymer.

According to a fifth aspect, the positive electrode is comprised of an electrode material layer based on a dischargeable metal oxide and/or metal chalcogenide which is secured to a positive casing or a positive current collector with an adhesive containing a conductive organic polymer.

BRIEF DESCRIPTION OF THE DRAWINGS

The novel features believed characteristic of the invention are set forth in the claims. The invention in accordance with preferred and exemplary embodiments, together with further objects and advantages thereof, is more particularly described in the following detailed description taken in conjunction with the accompanying drawing in which:

DESCRIPTION OF THE PREFERRED EMBODIMENTS

First embodiment

The secondary battery according to the first aspect includes a positive electrode which is comprised of a composite electrode material of laminate structure including a first electrode material layer of a conductive organic polymer and a second electrode material layer containing a dischargeable metal oxide and/or metal chalcogenide stacked one on another.

The conductive organic polymer is not particularly limited and may be selected from a variety of conductive polymers including polyaniline, polyacetylene, polypyrrole, polythiophene, poly-para-phenylene, polyacene and their derivatives, with the polyaniline being preferred. Examples of the polyaniline include chemical polyanilines prepared through chemical oxidative polymerization using chemical oxidizing agents such as $(NH_4)_2S_2O_8$, $FeCl_3$, $K_2Cr_2O_7$, and $KMnO_4$ as well as electrochemical polyanilines prepared through electrolytic oxidative polymerization. Preferred are the electrochemical polyanilines which are usually prepared through polymerization in an electrolytic polymerization solution containing aniline in a concentration of 0.01 to 5 mol/liter, preferably 0.5 to 3 mol/liter and an acid in a concentration of 0.02 to 10 mol/liter, preferably 1 to 6 mol/liter. The acid used herein may be hydrofluoric acid, hydrochloric acid, sulfuric acid, nitric acid, perchloric acid, borofluoric acid, or acetic acid, with the perchloric, borofluoric and sulfuric acids being preferred.

The conductive organic polymer of which the first electrode material layer is formed is preferably of sheet shape. The electrolytic polymerization process is advantageous in this respect too because the conductive organic polymer can be polymerized and deposited in sheet form, leading to simple manufacture of positive electrodes.

The dischargeable metal oxide and metal chalcogenide of which the second electrode material is formed are not particularly limited, but preferably selected from the following groups.

Examples of the metal oxide include oxides and composite oxides of metals such as Mn, V, Cr, Mo, Nb, W, Ti, Fe, Co, and Cu, for example, $MnO_2$, $V_2O_5$, $V_6O_{13}$, $Cr_2O_5$, $Cr_3O_8$, $MoO_3$, $WO_2$, $CuO$, $FeV_3O_8$, $LiCoO_2$, and $LiNiO_2$. The oxides may be composite oxides, that is, oxides doped with Li or the like and include amorphous ones. Examples of the metal chalcogenide include chalcogenides of metals such as Mo, Ti, Nb, V, Cr, Cu, Fe, and Co, for example, $MoS_2$, $TiS_2$, $NbS_2$, $NbSe_3$, $VS_2$, $VSe_2$, $CrS_2$, $CuS$, $FeS_2$, and $CoS_2$. Also, the chalcogenides may be doped with Li or the like and include amorphous ones.

The proportion of the conductive organic polymer in the first electrode material layer and the metal oxide and/or chalcogenide in the second electrode material layer is not particularly limited although it preferably ranges from 100:5 to 1:10, more preferably from 10:1 to 2:5.

Figure 1:
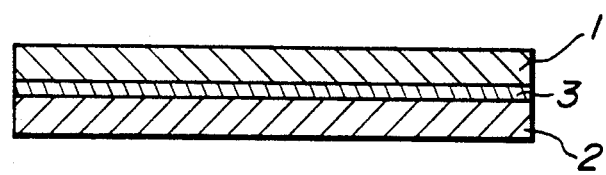
FIGS. 1 to 3 are cross-sectional views of exemplary structures of the positive electrode for use in a secondary battery according to a first embodiment of the invention.
Figure 2:
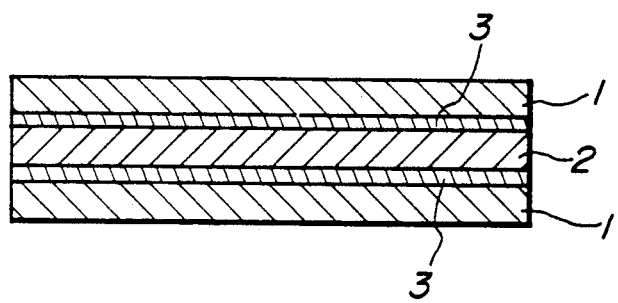
Figure 3:
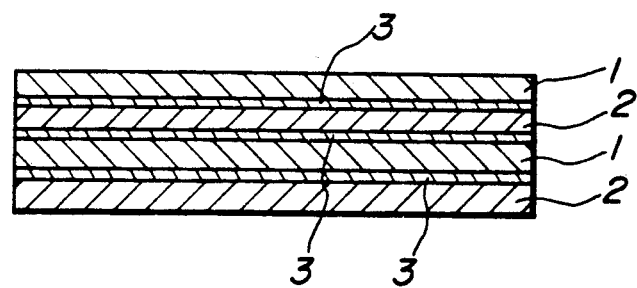

In the secondary battery according to the first aspect, the positive electrode is a laminate including a first electrode material layer of the conductive organic polymer and a second electrode material layer containing the metal oxide and/or chalcogenide. The electrode of the laminate structure may be prepared by any desired methods, typically by forming the first electrode material or conductive organic polymer into a sheet, forming the second electrode material or metal oxide and/or chalcogenide into a sheet, and bonding the first and second electrode material layers 1 and 2 through a conductive adhesive 3 into a laminate form as shown in FIG. 1. The sheet form used herein means that the electrode material has a generally flat shape which can serve as battery electrodes and thus includes plate and pellet shapes. An alternative structure is an integrated three-layer structure as shown in FIG. 2 in which a layer of the second electrode material or metal oxide and/or chalcogenide 2 is sandwiched between a pair of layers of the first electrode material or conductive organic polymer 1 and 1 through conductive adhesive layers 3. Also contemplated is an integrated four-layer structure as shown in FIG. 3 in which two sheets of the first electrode material 1, 1 and two sheets of the second electrode material 2, 2 are alternately stacked through three conductive adhesive layers 3, 3, 3. Multiple layer structures having five or more layers are also acceptable.

The sheet-shaped electrode material of the conductive organic polymer is available directly from the electrolytic polymerization process in which the conductive organic polymer is polymerized and deposited in sheet form. However, if the conductive organic polymer is not available in sheet form, it may be prepared in moldable forms including powder, granule, and fiber forms. Then it is formed into sheets by blending it with 1 to 50 parts by weight of a conductive powder such as carbon black, acetylene black, and graphite and 1 to 50 parts by weight of a binder such as powder fluoro-resin per 100 parts by weight of the conductive organic polymer, pressing the blend, kneading the blend with water or organic solvent, and roll milling the mixture into sheets, followed by drying. Also, the sheet-shaped electrode material containing the metal oxide and/or chalcogenide may be obtained by preparing the metal oxide and/or chalcogenide in moldable form and molding it in a similar procedure. The electrode material molding method mentioned above is not construed to be limitative.

The conductive adhesive for bonding the two types of electrode material together is not particularly limited although conductive adhesive compositions comprising conductive powder dispersed in an adhesive base are preferred. The conductive powder includes carbon black, graphite, acetylene black, conductive polymers, and metal particles. The adhesive base includes polyacrylic acid, polyacrylates, copolymers of acrylic acid and acrylates, carboxy-modified styrene-butadiene rubber, polychloroprene, carboxy-modified polychloroprene, polyisobutyrene, ethylenepropylene copolymers (EPT or EPDM), carboxymethyl cellulose (CMC), epoxy resins, fluoro resins, and starch. This conductive adhesive composition is referred to as conductive adhesive A, hereinafter. Often, conductive adhesive A contains 30 to 300 parts, preferably 50 to 200 parts by weight of the conductive powder per 100 parts by weight of the adhesive base.

In addition to the positive electrode, the secondary battery of the invention includes a negative electrode, an electrolyte, and optionally a separator. The secondary battery of the invention is not particularly limited in configuration. Where the battery is of the coin or button type including a pair of mated positive and negative casings, it is important to firmly secure the positive electrode to the positive casing or positive current collector for achieving good electrical conduction therebetween. In some preferred methods, the positive electrode is positioned in a metallic current collector which is then spot welded to a positive casing, or the positive electrode is bonded to a positive casing inner surface with a conductive adhesive. In this case, any desired adhesive may be used as long as it is conductive. Preferably, conductive adhesive A defined above is used for securing the positive electrode in the secondary battery according to the first aspect.

Positive members such as the positive casing and positive current collector which are in direct or indirect contact with the positive electrode active material are preferably formed of corrosion resistant conductive material. Stainless steel is preferred among others because of its corrosion resistance and cost. Most preferred are austenite and ferrite stainless steels.

For the positive electrode structure of FIG. 1, a secondary battery is constructed according to the invention by positioning the positive electrode such that the first electrode material layer 1 is on the side of the positive casing and the second electrode material layer 2 faces the negative electrode. More particularly, the positive electrode is positioned such that its conductive organic polymer layer is disposed on the side of the positive casing in the case of coin and button type batteries, and adjacent to the positive collector in the case of cylindrical batteries. Better results are obtained with such arrangements.

Second embodiment

According to the second embodiment, the positive electrode is comprised of an electrode material layer of a conductive organic polymer which is partially or entirely impregnated with an adhesive containing a dischargeable metal oxide and/or metal chalcogenide.

The conductive organic polymer used herein may be selected from the ones described in the first embodiment, with polyaniline having fibril structure being preferred. The metal oxide and chalcogenide may also be selected from the ones described in the first embodiment.

The extent to which the conductive organic polymer is impregnated with the metal oxide and/or chalcogenide is not particularly limited although the ratio of conductive organic polymer to metal oxide and/or chalcogenide preferably ranges from 20:1 to 1:3. A proportion of the metal oxide and/or chalcogenide below the range will be too low to provide the desired composite effect.

A higher proportion of the metal oxide and/or chalcogenide would adversely affect the bonding force of the adhesive composition or reduce the volume of the conductive organic polymer packed.

The positive electrode in composite form is prepared by partially or entirely impregnating a sheet of the conductive organic polymer with an adhesive composition containing the dischargeable metal oxide and/or metal chalcogenide and preferably a conductive agent.

More particularly, an adhesive composition (to be referred to as conductive adhesive B, hereinafter) is prepared by furnishing the metal oxide and/or metal chalcogenide in dispersible form such as powder and granule forms, blending it with a conductive agent (e.g., carbon black, graphite, acetylene black, conductive polymers, and metal particles) and an adhesive base (e.g., polyacrylic acid, polyacrylates, copolymers of acrylic acid and acrylates, carboxy-modified styrene-butadiene rubber, polychloroprene, carboxy-modified polychloroprene, polyisobutyrene, EPDM, CMC, epoxy resins, fluoro resins, and starch), and dispersing the blend in water or organic solvent. Then sheets of the conductive organic polymer are entirely or partially impregnated with conductive adhesive B.

Often, conductive adhesive B contains about 50 to 1000 parts, preferably about 200 to 700 parts by weight of the metal oxide and/or chalcogenide and about 30 to 500 parts, preferably about 50 to 200 parts by weight of the conductive agent per 100 parts by weight of the adhesive base. The conductive agent and the metal oxide and/or chalcogenide may in a weight ratio of from about 1/1000 to about ½.

Conductive adhesive B may be either nonaqueous or aqueous. It is preferred to remove the nonaqueous or aqueous component by vacuum or heating means after impregnation. The positive electrode is configured to sheet shape preferably having a thickness of about 0.1 to about 5 mm.

Preferably, the positive electrode of the above construction is secured to a positive casing or collector using conductive adhesive A.

Third embodiment

According to the third aspect, in a chargeable/dischargeable secondary battery comprising a positive electrode, a negative electrode, an electrolyte, a positive casing, and a positive current collector, the positive electrode is comprised of an electrode material layer of a conductive organic polymer which is secured to said positive casing or said positive current collector with an adhesive containing a dischargeable metal oxide and/or metal chalcogenide.

The conductive organic polymer used herein is as previously described in the first embodiment.

The adhesive containing a metal oxide and/or chalcogenide is preferably one containing the same components as conductive adhesive B.

In this embodiment, the conductive adhesive often contains about 50 to 1000 parts, preferably about 300 to 500 parts by weight of the metal oxide and/or chalcogenide and about 30 to 300 parts, preferably about 50 to 100 parts by weight of the conductive agent per 100 parts by weight of the adhesive base. Preferably, the amount of the metal oxide and/or chalcogenide blended in the conductive adhesive has a weight ratio of from about 1/100 to about 3/1, more preferably from 5/100 to 1/1 relative to the active material in the positive electrode to be bonded to the casing or collector with the adhesive. A ratio of less than 1/100 would be ineffective for the objects of the invention whereas a ratio above 3/1 would provide poor adhesive force or result in shortage of the positive electrode active material from a volumetric aspect.

Fourth embodiment

According to the fourth aspect, the positive electrode is comprised of an electrode material layer of a dischargeable metal oxide and/or metal chalcogenide which is partially or entirely impregnated with an adhesive containing a conductive organic polymer.

The metal oxide, metal chalcogenide, and conductive organic polymer used herein are the same as previously described in the first embodiment.

The adhesive containing a conductive organic polymer is preferably the same as conductive adhesive B except that the metal oxide and/or chalcogenide is replaced by the conductive organic polymer. This adhesive composition is referred to as conductive adhesive C, hereinafter.

Often, conductive adhesive C contains about 10 to 300 parts, preferably about 50 to 100 parts by weight of the conductive organic polymer and about 10 to 300 parts, preferably about 50 to 100 parts by weight of the conductive agent per 100 parts by weight of the adhesive base.

Preferably, the positive electrode of the above construction is secured to a positive casing or collector using conductive adhesive A.

Fifth embodiment

According to the fifth aspect, the positive electrode is comprised of an electrode material layer of a dischargeable metal oxide and/or metal chalcogenide which is secured to a positive casing or a positive current collector with an adhesive containing a conductive organic polymer.

The metal oxide, metal chalcogenide, and conductive organic polymer used herein are the same as previously described in the first embodiment.

The adhesive containing a conductive organic polymer is preferably conductive adhesive C.

In this embodiment, conductive adhesive C often contains about 30 to 300 parts, preferably about 50 to 100 parts by weight of the conductive organic polymer and about 30 to 300 parts, preferably about 50 to 100 parts by weight of of the conductive agent per 100 parts by weight of the adhesive base. Preferably, the amount of the conductive organic polymer blended in the conductive adhesive has a weight ratio of from about 1/1000 to about ½, more preferably from 1/1000 to 1/10 relative to the active material in the positive electrode to be bonded to the casing or collector with the adhesive. A ratio of less than 1/1000 would be ineffective for the objects of the invention whereas a ratio above ½ would provide poor adhesive force or result in shortage of positive electrode active material from a volumetric aspect.

The negative electrode in the secondary battery of the invention is not particularly limited although alkali metals, alloys of alkali metals with other metals, and composite materials of lithium and carbon are preferred for higher energy density. Especially preferred are alloys of lithium with other metals and composite materials of lithium and carbon. The lithium alloys include those alloys containing 1 to 80% by weight of lithium and at least one metal selected from the elements of Group IIa, IIb, IIIa, IVa, and Va in the Periodic Table, preferably those lithium alloys containing Al, In, Sn, Sb, Pb, Bi, Cd, or Zn or a mixture of two or more of them.

The electrolyte in the secondary battery of the invention is often a compound of an anion and a cation combined therewith. Examples include $LiSbF_6$, $LiAsF_6$, $LiPF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $ZnSO_4$, $ZnI_2$, $ZnBr_2$, $Al_2(SO_4)_3$, $AlCl_3$, $AlBr_3$, $AlI_3$, $KSCN$, $LiSO_3CS_2$, $(n-C_4H_7)_4NAsF_6$, $(n-C_4H_7)_4NPF_6$, $(n-C_4H_7)_4NClO_4$, $(n-C_4H_7)_4HBF_4$, $(C_2H_5)NClO_4$, and $(n-C_4H_7)_4NI$. Preferred among others are $LiBF_4$, $LiPF_6$, $LiAsF_6$, and mixtures thereof.

Often, these electrolytes are used in solution form in solvents, preferably polar solvents. Examples of the solvent include propylene carbonate, ethylene carbonate, diethyl carbonate, benzonitrile, acetonitrile, tetrahydrofuran, 2-methyltetrahydrofuran, γ-butyrolactone, triethyl phosphate, triethyl phosphite, dimethyl sulfate, dimethylformamide, dimethylacetamide, dimethylsulfoxide, dioxane, dimethoxyethane, diethoxyethane, polyethylene glycol, sulfolane, dichloroethane, chlorobenzene, and nitrobenzene, and mixtures thereof. Preferred among others are propylene carbonate, ethylene carbonate, diethyl carbonate, dimethoxyethane, and γ-butyrolactone alone and mixtures thereof.

The electrolyte used in the secondary battery of the invention further includes organic solid electrolytes which are obtained by impregnating such polymers as polyethylene oxide, polypropylene oxide, isocyanate-crosslinked polyethylene oxide, and a phosphazene polymer having an ethylene oxide oligomer side chain with the above-mentioned electrolyte solutions; and inorganic solid electrolytes, for example, inorganic ion conductors such as $Li_3N$ and $LiBCl_4$ and lithium glass species such as $Li_4SiO_4$ and $Li_3BO_3$.

The secondary battery of the invention is generally constructed by interposing the electrolyte between the positive and negative electrodes. If desired, a separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics, nets and porous members of synthetic resins such as polyethylene and polypropylene and natural fibers.

Figure 4:
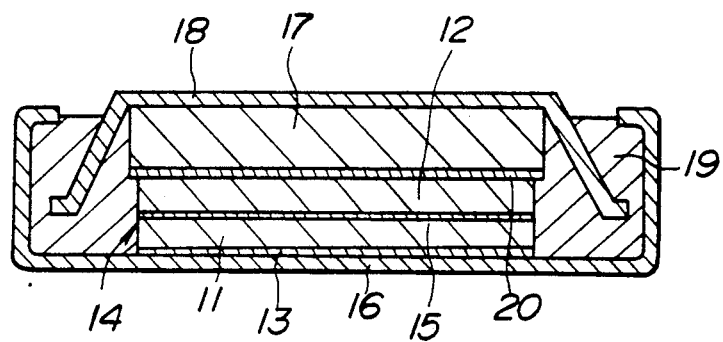
FIGS. 4, 5, 6, and 7 are cross-sectional views of secondary batteries according to different embodiments of the invention.
Figure 5:
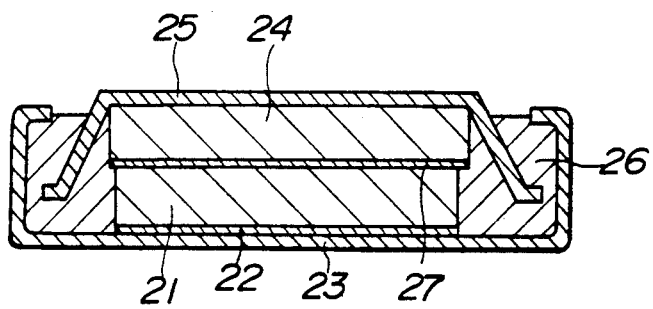
Figure 6:
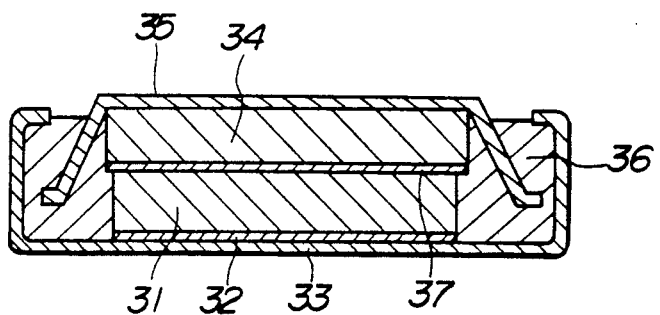

The outline structure of the secondary battery according to different embodiments of the present invention are shown in FIGS. 4, 5, and 6.

FIG. 4 shows one typical coin type secondary battery according to the first embodiment of the invention. The battery includes a positive electrode 14, a separator 20, and a negative electrode 17 in a sandwich structure. A positive casing 16 and a negative casing 18 are mated together to define a cell space. The sandwich of positive electrode 14, separator 20, and negative electrode 17 is disposed in the space between the positive and negative casings 16 and 18. An annular gasket 19 is interposed between the casings 16 and 18 to form a seal therebetween. In this embodiment, the positive electrode 14 includes a first or conductive organic polymer layer 11, a second or metal oxide layer 12, conductive adhesive layers 13 and 15, wherein the first electrode layer 11 is bonded to the second electrode layer 12 through the adhesive layer 15 to form the laminated positive electrode 14 and is secured to the positive casing 16 through the adhesive layer 13.

The battery of FIG. 5 includes a positive electrode 21, a separator 27, and a negative electrode 24 in a sandwich structure. A pair of positive and negative casings 23 and 25 are mated together to define a cell space. The sandwich of positive electrode 21, separator 27, and negative electrode 24 is disposed in the space between the positive and negative casings 23 and 27 while the positive electrode 21 is secured to the positive casing 23 through an adhesive layer 22. An annular gasket 26 is interposed between the casings 23 and 27 to form a seal therebetween.

The battery of FIG. 6 includes a positive electrode 31, a conductive adhesive layer 32, a positive casing 33, a negative electrode 34, a negative casing 35, a gasket 36, and a separator 37 in the same arrangement as in FIG. 5.

EXAMPLE

Examples of the invention are given below together with comparative examples by way of illustration and not by way of limitation. In the examples, C. $MnO_2$ is chemically synthesized $MnO_2$, E. $MnO_2$ is electrolytic $MnO_2$, PAn is polyaniline, V is volt, and mA is milliampere.

EXAMPLE 1

An electrode material was prepared by conducting constant current flow across mesh stainless steel (SUS 316) at a current density of 6 mA/cm$^2$ in an aqueous solution containing 1 mol/liter of aniline and 2 mol/liter of $HBF_4$, thereby polymerizing and depositing aniline on the mesh. The polyaniline deposit on mesh steel was washed with distilled water, dried, and punched to a disk having a diameter of 15 mm.

Another electrode material was prepared by heat treating chemically synthesized manganese dioxide at 375° C. for 6 hours, blending 100 parts by weight of the manganese dioxide, 10 parts by weight of graphite as a conductive agent, and 5 parts by weight of Teflon powder as a binder, and molding the blend under pressure into a disk having a diameter of 15 mm.

A conductive adhesive was prepared by mixing and dispersing highly conductive carbon powder, polyacrylic acid binder and distilled water in a weight ratio of 2:1:8. Using this adhesive, the polyaniline disk was bonded to the manganese dioxide disk to form a composite positive electrode.

A coin type secondary battery as shown in FIG. 4 was assembled by placing a positive electrode 14 in a positive casing 16 with a polyaniline electrode layer 11 disposed adjacent to the positive casing inner surface and bonding the electrode 14 to the positive casing 16 through the conductive adhesive.

The negative electrode 17 was a disk of lithium, aluminum alloy having a diameter of 15 mm. The electrolyte solution was a mixture of propylene carbonate and dimethoxyethane (volume ratio 1:1) containing 3 mol/liter of $LiBF_4$.

More specifically, as shown in FIG. 4, the positive electrode 14 includes a polyaniline electrode layer 11, a manganese dioxide electrode layer 12, conductive adhesive layers 13 and 15, wherein the polyaniline electrode layer 11 is bonded to the manganese dioxide electrode layer 12 through adhesive layer 15 to form the laminate positive electrode 14 and is secured to the positive casing 16 through adhesive layer 13.

The battery thus fabricated was subjected to a pulse discharge test in which discharge at a current flow of 5 mA for 40 msec. was repeated at intervals of 100 msec. at temperatures of 25° C. and −10° C. For evaluating the pulse discharge property of the battery, the battery voltage was measured both before the test and immediately before the fifth pulse discharge to determine the difference (ΔV) therebetween. The result is shown in Table 1. It is understood that a lower ΔV value indicates better pulse discharge property.

A fresh battery fabricated as above was subjected to a cycle test under the conditions: charge voltage 3.5 V, charge resistance 100 Ω, charge time 15 hours, discharge resistance 5 kΩ, and discharge terminating voltage 0.5 V. The result of the cycle test is also shown in Table 1. It is understood that more cycles indicate better cycle performance.

EXAMPLE 2

A secondary battery of the same construction as Example 1 was fabricated except that the electrode layer containing manganese dioxide was bonded to the positive casing.

The battery was subjected to the pulse discharge and cycle tests The results are shown in Table 1.

EXAMPLES 3-10

Secondary batteries of the same construction as Example 1 were fabricated except that the chemically synthesized manganese dioxide was replaced by electrolytic manganese dioxide, $LiV_3O_8$, $V_2O_5$, $LiCoO_2$, $CrO_3$, $TiO_2$, $MoS_2$, and $TiS_2$.

Each battery was subjected to the pulse discharge and cycle tests. The results are shown in Table 1.

COMPARATIVE EXAMPLES 1-2

Secondary batteries of the same construction as Example 1 were fabricated except that the composite positive electrode was replaced by a positive electrode consisting solely of a polyaniline sheet and a positive electrode consisting essentially of chemically synthesized manganese dioxide.

Each battery was subjected to the pulse discharge and cycle tests. The results are shown in Table 1.

TABLE 1

| | Positive electrode material | | ΔV (volts) | | Cycle life |
|---|---|---|---|---|---|
| | Separator side | Positive casing side | 25° C. | −10° C. | (cycles) |
| E1 | C. $MnO_2$ | PAn | 0.210 | 0.670 | 50 |
| E2 | PAn | C. $MnO_2$ | 0.210 | 0.770 | 35 |
| E3 | E. $MnO_2$ | PAn | 0.210 | 0.650 | 50 |
| E4 | $LiV_3O_8$ | PAn | 0.250 | 0.720 | 48 |
| E5 | $V_2O_5$ | PAn | 0.240 | 0.700 | 55 |
| E6 | $LiCoO_2$ | PAn | 0.220 | 0.700 | 40 |
| E7 | $CrO_3$ | PAn | 0.250 | 0.770 | 48 |
| E8 | $TiO_2$ | PAn | 0.270 | 0.800 | 45 |
| E9 | $MoS_2$ | PAn | 0.260 | 0.750 | 55 |
| E10 | $TiS_2$ | PAn | 0.240 | 0.710 | 53 |
| CE1 | C. $MnO_2$ | | 0.200 | 0.650 | 20 |
| CE2 | PAn | | 0.420 | 1.130 | 100 |

As seen from Table 1, only those batteries having the composite positive electrodes meet both the pulse discharge and cycle life requirements.

The secondary batteries of the examples have a very high initial discharge capacity and continue stable charge/discharge performance from the second to subsequent cycles over an extended period of time. The increased initial discharge capacity permits the batteries to maintain their discharge capacity until use even when they are stored as installed in electric equipment for a long time. Once used, they keep stable charge/discharge performance over an extended period of time. Also, the pulse discharge test shows that the batteries of the examples are improved in pulse discharge, indicating that they are advantageously used as a power supply for electric equipment requiring digital signal generation and transmission.

EXAMPLE 11

An electrode material was prepared by conducting constant current flow across mesh stainless steel (SUS 316) at a current density of 6 mA/cm² in an aqueous solution containing 1 mol/liter of aniline and 2 mol/liter of $HBF_4$, thereby polymerizing and depositing aniline on the mesh. The polyaniline deposit on mesh steel was washed with distilled water, dried, and punched to a disk having a diameter of 15 mm.

A conductive adhesive was prepared by mixing and dispersing chemically synthesized manganese dioxide which had been heat treated at 375° C. for 6 hours, carbon black, polyacrylic acid and water in a weight ratio of 5:4:2:10.

A coin type secondary battery as shown in FIG. 5 was assembled by bonding a positive electrode 21 in the form of the polyaniline disk to a positive casing 23 through a layer 22 of the conductive adhesive.

The negative electrode 24 was a disk of lithiumaluminum alloy having a diameter of 15 mm. The electrolyte solution was a mixture of propylene carbonate and dimethoxyethane (volume ratio 1:1) containing 3 mol/liter of $LiBF_4$.

The battery thus fabricated was subjected to a pulse discharge test in which discharge at a current flow of 5 mA for 40 msec. was repeated at intervals of 100 msec. at temperatures of 25° C. and −10° C. For evaluating the pulse discharge property of the battery, the battery voltage was measured both immediately before the fifth pulse discharge and at the end of the test to determine the difference (ΔV) therebetween. The result is shown in Table 2.

EXAMPLES 12-19

Secondary batteries of the same construction as Example 11 were fabricated except that, instead of the chemically synthesized manganese dioxide, electrolytic manganese dioxide, $LiV_3O_8$, $V_2O_5$, $LiCoO_2$, $CrO_3$, $TiO_2$, $MoS_2$, and $TiS_2$. were independently blended in the conductive adhesives.

Each battery was subjected to the pulse discharge test. The results are shown in Table 2.

COMPARATIVE EXAMPLE 3

A secondary battery of the same construction as Example 11 was fabricated except that the conductive adhesive was free of metal oxide or chalcogenide.

The battery was subjected to the pulse discharge test. The results are shown in Table 2.

TABLE 2

| | Material in adhesive | Positive electrode | ΔV (volts) | |
|---|---|---|---|---|
| | | | 25° C. | −10° C. |
| E11 | C. $MnO_2$ | PAn | 0.150 | 0.650 |
| E12 | E. $MnO_2$ | PAn | 0.150 | 0.650 |
| E13 | $LiV_3O_8$ | PAn | 0.180 | 0.670 |
| E14 | $V_2O_5$ | PAn | 0.200 | 0.680 |
| E15 | $LiCoO_2$ | PAn | 0.160 | 0.650 |
| E16 | $CrO_3$ | PAn | 0.210 | 0.700 |

TABLE 2-continued

| | Material in adhesive | Positive electrode | ΔV (volts) 25° C. | ΔV (volts) −10° C. |
| --- | --- | --- | --- | --- |
| E17 | TiO$_2$ | PAn | 0.220 | 0.750 |
| E18 | MoS$_2$ | PAn | 0.200 | 0.700 |
| E19 | TiS$_2$ | PAn | 0.190 | 0.680 |
| CE3 | — | PAn | 0.400 | 1.030 |

As seen from Table 2, the batteries of the examples meet the pulse discharge requirement.

EXAMPLE 20

A positive electrode was prepared by heat treating chemically synthesized manganese dioxide at 375° C. for 6 hours, blending 100 parts by weight of the manganese dioxide, 10 parts by weight of graphite as a conductive agent, and 5 parts by weight of Teflon powder as a binder, and molding the blend under pressure into a disk having a diameter of 15 mm.

Polyaniline powder was prepared by conducting constant current flow across mesh stainless steel (SUS 316) at a current density of 6 mA/cm$^2$ in an aqueous solution containing 1 mol/liter of aniline and 2 mol/liter of HBF$_4$, thereby polymerizing and depositing aniline on the mesh. The polyaniline deposit was washed with distilled water, ground into powder, and then dried.

A conductive adhesive was prepared by mixing the polyaniline powder, carbon black, polyacrylic acid and water in a weight ratio of 1:1:2:10.

A coin type secondary battery as shown in FIG. 6 was assembled by bonding a positive electrode 31 in the form of the manganese dioxide-containing disk to a positive casing 33 through a layer 32 of the conductive adhesive.

The negative electrode 34 was a disk of lithium. aluminum alloy having a diameter of 15 mm. The electrolyte solution was a mixture of propylene carbonate and dimethoxy. ethane (volume ratio 1:1) containing 3 mol/liter of LiBF$_4$.

The battery thus fabricated was subjected to a cycle test under the conditions: charge voltage 3.5 V, charge resistance 100 Ω, charge time 15 hours, discharge resistance 5 kΩ, and discharge terminating voltage 0.5 V. The result of the cycle test is shown in Table 3.

EXAMPLES 21-28

Secondary batteries of the same construction as Example 20 were fabricated except that, instead of the chemically synthesized manganese dioxide, electrolytic manganese dioxide, LiV$_3$O$_8$, V$_2$O$_5$, LiCoO$_2$, CrO$_3$, TiO$_2$, MoS$_2$, and TiS$_2$ were independently used to form positive electrodes.

Each battery was subjected to the cycle test. The results are shown in Table 3.

COMPARATIVE EXAMPLE 4

A secondary battery of the same construction as Example 20 was fabricated except that the conductive adhesive was free of polyaniline.

The battery was subjected to the cycle test. The results are shown in Table 3.

TABLE 3

| | Material in adhesive | Positive electrode | Cycle life (cycles) |
| --- | --- | --- | --- |
| E20 | PAn | C. MnO$_2$ | 35 |

TABLE 3-continued

| | Material in adhesive | Positive electrode | Cycle life (cycles) |
| --- | --- | --- | --- |
| E21 | PAn | E. MnO$_2$ | 33 |
| E22 | PAn | LiV$_3$O$_8$ | 31 |
| E23 | PAn | V$_2$O$_5$ | 38 |
| E24 | PAn | LiCoO$_2$ | 30 |
| E25 | PAn | CrO$_3$ | 30 |
| E26 | PAn | TiO$_2$ | 34 |
| E27 | PAn | MoS$_2$ | 35 |
| E28 | PAn | TiS$_2$ | 36 |
| CE4 | — | C. MnO$_2$ | 22 |

As seen from Table 3, the batteries using the conductive adhesive containing polyaniline meet the cycle life requirement.

EXAMPLE 29

A positive electrode was prepared by conducting current flow across mesh stainless steel (SUS 316) at a current density of 6 mA/cm$^2$ in an aqueous solution containing 1 mol/liter of aniline and 2 mol/liter of HBF$_4$, thereby polymerizing and depositing aniline on the mesh. The polyaniline deposit on mesh steel was washed with distilled water, dried, and punched to a disk having a diameter of 15 mm.

An impregnating composition or conductive adhesive composition was prepared by mixing chemically synthesized manganese dioxide which had been heat treated at 375° C. for 6 hours, carbon black, polyacrylic acid and water in a weight ratio of 11:2:1:19.

The polyaniline positive electrode was impregnated with the composition and then heat dried at 100° C. for 6 hours.

A coin type secondary battery was assembled by bonding the positive electrode of polyaniline to a positive casing of stainless steel (SUS 444) through the same conductive adhesive as used in Example 1. The negative electrode was a disk of lithium-aluminum alloy having a diameter of 15 mm. The electrolyte solution was a mixture of propylene carbonate and dimethoxyethane (volume ratio 1:1) containing 3 mol/liter of LiBF$_4$.

The battery thus fabricated was measured for initial capacity. The test conditions included charge voltage 3.5 V, charge resistance 100 Ω, charge time 15 hours, discharge resistance 5 kΩ, and discharge terminating voltage 0.5 V.

The result is shown in Table 4.

EXAMPLES 30-36

Secondary batteries of the same construction as Example 29 were fabricated except that, instead of the chemically synthesized manganese dioxide, electrolytic manganese dioxide, LiV$_3$O$_8$, V$_2$O$_5$, CrO$_3$, TiO$_2$, MoS$_2$, and TiS$_2$ were independently blended in the impregnating compositions.

Each battery was measured for initial capacity. The results are shown in Table 4.

COMPARATIVE EXAMPLE 5

A secondary battery of the same construction as Example 29 was fabricated except that the positive electrode of polyaniline was used without impregnation.

The battery was measured for initial capacity. The results are shown in Table 4.

TABLE 4

| | Positive electrode | | Initial |
| --- | --- | --- | --- |
| | Impregnant | Base material | capacity (mAh) |
| E29 | C. $MnO_2$ | PAn | 5.0 |
| E30 | E. $MnO_2$ | PAn | 5.0 |
| E31 | $LiV_3O_8$ | PAn | 4.8 |
| E32 | $V_2O_5$ | PAn | 5.5 |
| E33 | $CrO_3$ | PAn | 4.8 |
| E34 | $TiO_2$ | PAn | 4.5 |
| E35 | $MoS_2$ | PAn | 4.5 |
| E36 | $TiS_2$ | PAn | 4.3 |
| CE5 | — | PAn | 3.7 |

It is evident from Table 4 that the impregnation of polyaniline positive electrode material with metal oxide or chalcogenide is effective in improving a battery's initial capacity.

EXAMPLE 37

A positive electrode material was prepared by heat treating chemically synthesized manganese dioxide at 375° C. for 6 hours, blending 100 parts by weight of the manganese dioxide, 10 parts by weight of graphite as a conductive agent, and 5 parts by weight of Teflon powder as a binder, and molding the blend under pressure into a disk having a diameter of 15 mm.

Polyaniline powder was prepared by conducting constant current flow across mesh stainless steel (SUS 316) at a current density of 6 mA/cm$^2$ in an aqueous solution containing 1 mol/liter of aniline and 2 mol/liter of $HBF_4$, thereby polymerizing and depositing aniline on the mesh. The polyaniline deposit was washed with distilled water, ground into powder, and then dried.

An impregnating composition was prepared by mixing the polyaniline powder, carbon black, polyacrylic acid and water in a weight ratio of 2:1:2:10.

The manganese dioxide base positive electrode was impregnated with the composition and then heat dried at 100° C. for 6 hours.

A coin type secondary battery was assembled by bonding the manganese dioxide base positive electrode to a positive casing through the same conductive adhesive as used in Example 1. The negative electrode was a disk of lithium. aluminum alloy having a diameter of 15 mm. The electrolyte solution was a mixture of propylene carbonate and dimethoxy. ethane (volume ratio 1:1) containing 3 mol/liter of $LiBF_4$.

The battery thus fabricated was subjected to a cycle test. The test conditions included charge voltage 3.5 V, charge resistance 100 Ω, charge time 15 hours, discharge resistance 5 kΩ, and discharge terminating voltage 0.5 V.

The result is shown in Table 5.

EXAMPLES 38–44

Secondary batteries of the same construction as Example 37 were fabricated except that instead of the chemically synthesized manganese dioxide, electrolytic manganese dioxide, $LiV_3O_8$, $V_2O_5$, $CrO_3$, $TiO_2$, $MoS_2$, and $TiS_2$ were independently used to form positive electrodes.

Each battery was subjected to a cycle test. The results are shown in Table 5.

COMPARATIVE EXAMPLE 6

A secondary battery of the same construction as Example 37 was fabricated except that the manganese dioxide base positive electrode was used without impregnation.

The battery was subjected to a cycle test. The results are shown in Table 5.

TABLE 5

| | Positive electrode | | Cycle life |
| --- | --- | --- | --- |
| | Impregnant | Base material | (cycles) |
| E37 | PAn | C. $MnO_2$ | 35 |
| E38 | PAn | E. $MnO_2$ | 33 |
| E39 | PAn | $LiV_3O_8$ | 31 |
| E40 | PAn | $V_2O_5$ | 38 |
| E41 | PAn | $CrO_3$ | 30 |
| E42 | PAn | $TiO_2$ | 34 |
| E43 | PAn | $MoS_2$ | 35 |
| E44 | PAn | $TiS_2$ | 36 |
| CE6 | — | C. $MnO_2$ | 22 |

It is evident from Table 5 that the impregnation of metal oxide or chalcogenide base positive electrode material with polyaniline is effective in improving the cycle life of the battery.

Figure 7:
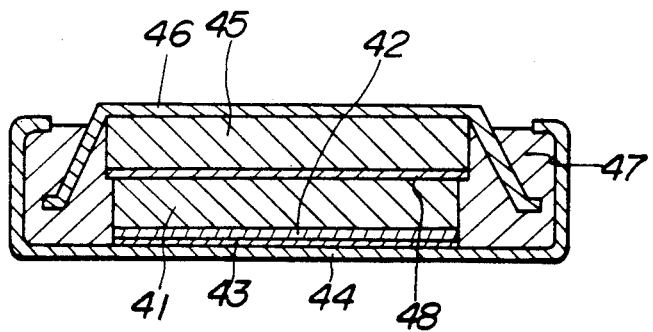

Although the positive electrode is secured to the positive casing with an adhesive in the batteries of FIGS. 4 to 6, the positive electrode may be secured to a positive collector as shown in FIG. 7. The FIG. 7 embodiment includes a positive electrode 41, a conductive adhesive layer 42, a positive collector 43, a positive casing 44, a negative electrode 45, a negative casing 46, a gasket 47, and a separator 48.

Although some preferred embodiments have been described, many modifications and variations may be made thereto in the light of the above teachings. It is therefore to be understood that within the scope of the appended claims, the invention may be practiced otherwise than as specifically described.

We claim:

1. A chargeable/dischargeable secondary battery comprising a positive electrode, a negative electrode, and an electrolyte, characterized in that
    said positive electrode is comprised of a composite electrode material of laminate structure including a first electrode material layer of a conductive organic polymer and a second electrode material layer containing a dischargeable metal oxide and-/or metal chalcogenide stacked one on another.

2. The secondary battery of claim 1 wherein said first and second electrode material layers are bonded with a conductive adhesive containing carbon.

3. The secondary battery of claim 1 wherein said first electrode material layer is disposed on the side of a positive casing or a positive current collector.

4. The secondary battery of claim 1 wherein said positive electrode is secured to a positive casing or a positive current collector with a conductive adhesive containing carbon.

5. A chargeable/dischargeable secondary battery comprising a positive electrode, a negative electrode, and an electrolyte, characterized in that
    said positive electrode is comprised of an electrode material layer of a conductive organic polymer which is at least partially impregnated with an adhesive containing a dischargeable metal oxide and/or metal chalcogenide.

6. The secondary battery of claim 5 wherein said electrode material is entirely impregnated with the adhesive.

7. The secondary battery of claim 5 wherein said positive electrode is secured to a positive casing or a positive current collector with a conductive adhesive containing carbon.

8. A chargeable/dischargeable secondary battery comprising a positive electrode, a negative electrode, an electrolyte, a positive casing, and a positive current collector, characterized in that
said positive electrode is comprised of an electrode material layer based on a conductive organic polymer which is secured to said positive casing or said positive current collector with an adhesive containing a dischargeable metal oxide and/or metal chalcogenide.

9. A chargeable/dischargeable secondary battery comprising a positive electrode, a negative electrode, and an electrolyte, characterized in that
said positive electrode is comprised of an electrode material layer based on a dischargeable metal oxide and/or metal chalcogenide which is at least partially impregnated with an adhesive containing a conductive organic polymer.

10. The secondary battery of claim 9 wherein said electrode material is entirely impregnated with the adhesive.

11. The secondary battery of claim 9 wherein said positive electrode is secured to a positive casing or a positive current collector with a conductive adhesive containing carbon.

12. A chargeable/dischargeable secondary battery comprising a positive electrode, a negative electrode, and an electrolyte, characterized in that
said positive electrode is comprised of an electrode material layer of a dischargeable metal oxide and/or metal chalcogenide which is secured to a positive casing or a positive current collector with an adhesive containing a conductive organic polymer.

* * * * *